Aug. 29, 1950 W. P. PIERON 2,520,780
CRAB NET
Filed May 15, 1946
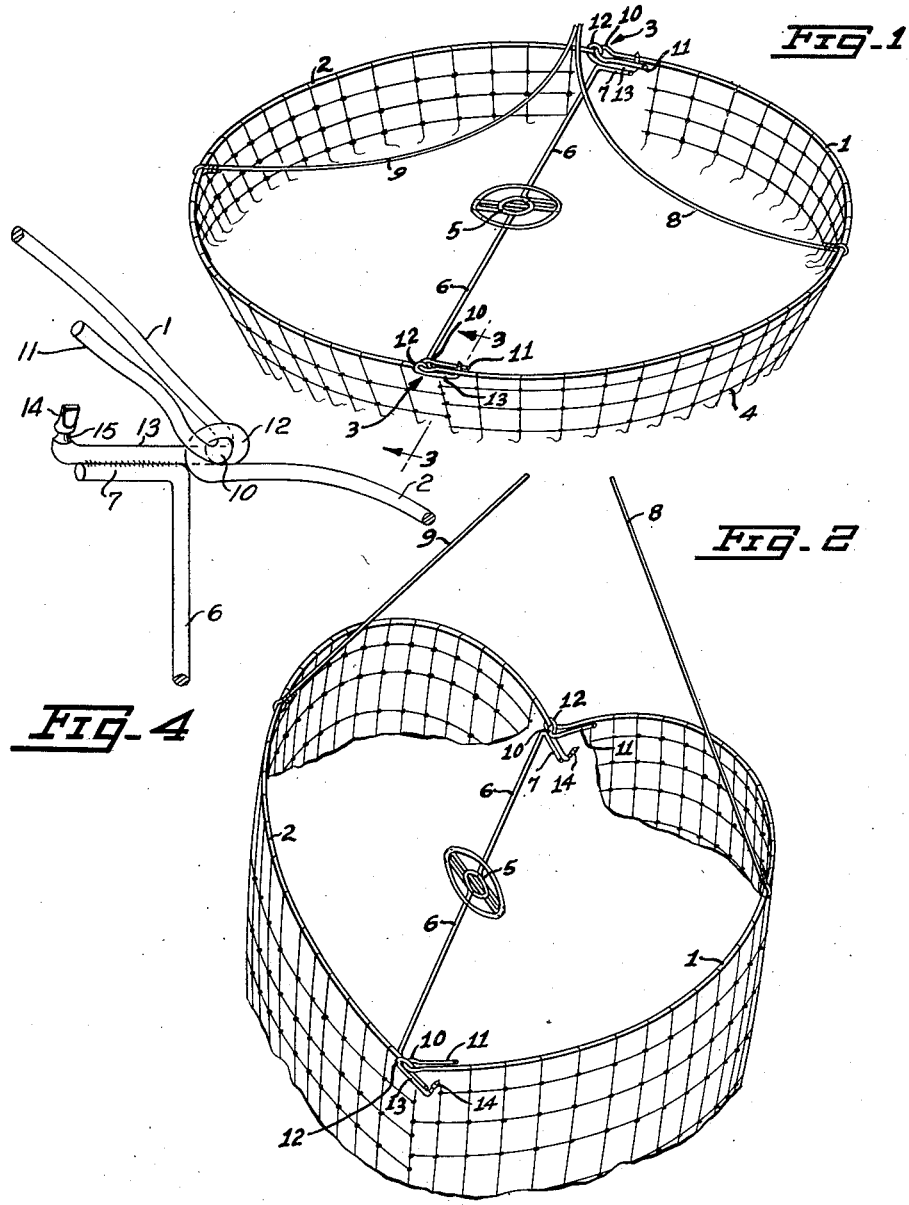
INVENTOR
William P. Pieron
BY
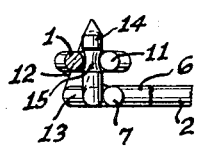
ATTORNEYS Patented Aug. 29, 1950

2,520,780

UNITED STATES PATENT OFFICE 2,520,780

CRAB NET

William P. Pieron, Forest Hills, N. Y.

Application May 15, 1946, Serial No. 669,878

3 Claims. (Cl. 43—105)

1

This invention relates to crab nets and more particularly to an improved fastening means for holding a crab net in open position and for permitting it to be closed when desired.

In the conventional form of crab net, the cloth netting is secured to a frame of wire, which may be of any shape, but which is generally circular or oval. The frame is formed in two sections hinged to each other and the line, by means of which the net is lowered into the water, is provided with branches connected to each section. A bait container is arranged in the net.

In the operation of such devices the weight of the frame is relied upon to hold the net open when it is being lowered into the water and there is no pull on the line. When a pull is exerted on the line to raise the net, the pull causes the hinged sections of the net to move toward each other and close.

In the present invention I provide an improvement over the conventional crab net consisting of means for locking the net in open position, said means being capable of being released by a pull on the line. The ends of one of the frame members are bent and then extended backwardly parallel to the body portion of the member. The ends of the other member are coiled, at right angles to the bends so that the bends and coils, when fitted together, form a hinge. Beyond the coil, the ends of the second member are extended in proximity to the extended portion of the first member and provided with a terminal portion at right angles to the extended ends of the second member, which is received between the two sections of the end of the other frame member when the net is opened. These terminals may be provided with reduced portions thereby forming a locking means which will normally retain the net in open position but, due to the natural resiliency of the metal, will release when a pull is exerted on the line and thus permit the net to close.

In the accompanying drawing I have shown one embodiment of the invention. In this showing, Fig. 1 is a perspective view of the net in open position, the netting being broken away;

Fig. 2 is a similar view of the device in partially closed position;

Fig. 3 is a detail, sectional view on line 3—3 of Fig. 1, and

Fig. 4 is a detailed, perspective view of the adjacent ends of the frame members showing the locking means in partially opened position.

2

Referring to the drawing, the frame comprises a pair of frame members 1 and 2, preferably formed of wire. The ends of these members are hinged to each other at 3 to permit the net to be arranged in open position as shown in Fig. 1 or closed, the net being shown partially closed in Fig. 2. A cloth netting 4 of conventional form is connected to the frame, this netting being closed at the bottom. A bait holder 5 may be supported in the net in any suitable way. As shown, it is mounted on a rod or wire 6 which extends across the net and is provided with offset ends 7 soldered, or otherwise secured, to one of the frame members. As is conventional, the net is manipulated by a line having branches 8 and 9, which are connected to the two frame members at points intermediate the hinges 3.

The novel feature of the net consists of a locking hinge. As shown, each end of the frame member 1 is provided with a bend 10 arranged in a horizontal plane and beyond the bend the end of the frame member is extended as at 11, and slightly spaced from the adjacent portion of the frame member (see Fig. 4). The other frame member 2 is coiled adjacent its end in a vertical plane as at 12. Beyond the coil this member is extended toward the other frame member as at 13 and is provided with a terminal portion 14 at an angle to the extended portion 13. This terminal portion may be provided with a portion 15 of reduced cross section.

When the net is partially closed, as shown in Fig. 2 of the drawing, it will be seen that the terminal portion 14 is out of engagement with the other frame member and the bends and coils 10 and 12 function as an ordinary hinge. As the net is moved toward an open position, the terminal portion 14 enters the space between the extended end 11 and the body portion of the member 1, as shown in Figs. 1 and 3, and when the reduced portion 15 is received between these two portions of the other frame member, it acts as a lock to retain the net in open position. Thus, the net is retained in open position while being lowered into the water and is not in danger of being closed by any buoyancy or movement of the water. When the net is at rest on the bed of the body of water and a crab attempts to remove the bait from the bait holder 5, the user of the net pulls on the line, which exerts a pull on the branches 8 and 9 sufficient to overcome the force holding the terminals 14 of the frame member 2 between the two parts of the frame member 1 and the net can thus be closed and raised from the water.

I claim:

1. A crab net comprising a pair of substantially semi-circular wire frame members hinged to each other at their ends, one of said members having a bend adjacent each end thereof, and then extended and slightly spaced from the portion of the member adjacent the bend, the second member being provided with a coil at each end thereof to engage the bend in the first member, and a straight extension beyond the coil having a bend at one end thereof adapted to be received between the spaced portions of the other member when the frame members are in one position.

2. A crab net comprising a pair of substantially semi-circular wire frame members hinged to each other at their ends, one of said members having a bend adjacent each end thereof, and then extended and slightly spaced from the portion of the member adjacent the bend, the second member being provided with a coil at each end thereof to engage the bend in the first member, and being extended beyond the coil adjacent the first member, and having a terminal at an angle to the extension to be received between the spaced portions of the first member.

3. A crab net comprising a pair of substantially semi-circular wire frame members hinged to each other at their ends, one of said members having a bend adjacent each end thereof, and then extended and slightly spaced from the portion of the member adjacent the bend, the second member being provided with a coil at each end thereof to engage the bend in the first member, and being extended beyond the coil adjacent the first member, and having a terminal at an angle to the extension to be received between the spaced portions of the first member, the terminal being provided with a reduced portion to lock it between the spaced portions of the first member.

WILLIAM P. PIERON.

REFERENCES CITED

The following references are of record in the file of this patent:

UNITED STATES PATENTS

| Number | Name | Date |
|---|---|---|
| 551,468 | Hibbert | Dec. 17, 1895 |
| 1,420,396 | Warren | June 20, 1922 |
| 2,072,898 | Martin | Mar. 9, 1937 |